US012701437B2

(12) United States Patent
Badman et al.

(10) Patent No.: US 12,701,437 B2
(45) Date of Patent: Aug. 4, 2026

(54) METHODS AND SYSTEMS FOR PERFORMANCE-BASED ALARMING AND RESOLUTION

(71) Applicant: T-Mobile Innovations LLC, Overland Park, KS (US)

(72) Inventors: Ernest W. Badman, Burleson, TX (US); Nicholas D. Emmrich, The Colony, TX (US); Dean Griffin, Sherman, TX (US); Marion B. Lawver, Lenexa, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 309 days.

(21) Appl. No.: 18/629,915

(22) Filed: Apr. 8, 2024

(65) Prior Publication Data

US 2025/0317755 A1      Oct. 9, 2025

(51) Int. Cl.
| | |
|---|---|
| *H04M 3/00* | (2024.01) |
| *H04W 24/02* | (2009.01) |

(52) U.S. Cl.
CPC .................................. *H04W 24/02* (2013.01)

(58) Field of Classification Search
CPC .. H04W 24/02; H04W 24/025; H04L 41/082; H04L 41/0894; H04L 12/24; H04L 12/26
See application file for complete search history.

(56) References Cited

U.S. PATENT DOCUMENTS

| | | | | |
|---|---|---|---|---|
| 8,364,519 B1 * | 1/2013 | Basu | ................ | G06Q 10/06393 |
| | | | | 705/7.38 |
| 8,782,216 B2 * | 7/2014 | Raghavendran | .... | H04L 12/6418 |
| | | | | 709/224 |
| 10,397,810 B2 * | 8/2019 | Yang | ..................... | H04W 24/04 |
| 11,922,357 B2 * | 3/2024 | Niyazov | ................. | H04L 43/16 |
| 2011/0275364 A1 * | 11/2011 | Austin | .................. | H04W 24/04 |
| | | | | 455/423 |
| 2016/0366036 A1 * | 12/2016 | Gupta | ................... | G06F 3/0481 |
| 2017/0004433 A1 * | 1/2017 | Raghavan | ........ | G06Q 10/06393 |
| 2017/0364819 A1 * | 12/2017 | Yang | ...................... | H04L 41/16 |
| 2019/0356533 A1 * | 11/2019 | Vasseur | .................. | G06N 3/088 |
| 2021/0176115 A1 * | 6/2021 | Thampy | ................. | H04B 17/23 |
| 2025/0141761 A1 * | 5/2025 | Pham Van | .............. | H04L 43/04 |
| 2025/0293925 A1 * | 9/2025 | Wozich | ................. | H04L 41/082 |

FOREIGN PATENT DOCUMENTS

| | | | | | |
|---|---|---|---|---|---|
| EP | | 3322126 A1 * | 5/2018 | ............. | H04L 43/16 |
| WO | WO-2025017649 A1 * | | 1/2025 | ......... | H04L 41/5009 |

* cited by examiner

*Primary Examiner* — Marceau Milord

(57) ABSTRACT

A method for comprises determining an expected performance value of a network element in the radio access network based on a history of a key performance indicator describing the network element over a predefined period of time, the expected performance value comprising a permissible range or a threshold of the key performance indicator for the network element, obtaining a performance rule for the key performance indicator based on the expected performance value of the network element, inputting a current value of the key performance indicator into the performance rule to determine whether to alert an incident reporting application to generate a performance alarm based on the current value of the key performance indicator, and generating the performance alarm and a corresponding incident report based on the current value of the key performance indicator.

17 Claims, 8 Drawing Sheets

100

104

OSS

102

RAN

108

Cell Site
Maintenance
Tracking

110

Alarms
Configuration

106

Network

116

NOC
Dashboard

112

Automated
Alarms
Handling

Incident
Mgmt
App

114

120

122

Performance
App

Incident
Reporting
App

118

Performance Rule 133

Exp Performance
Value(s) 136

(History of) KPI(s) 141

False Positive
Factors 145

130

200

250

300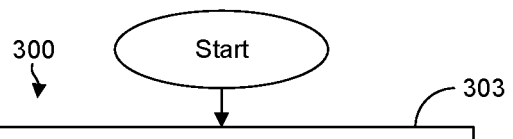

Start

303

Obtaining, from a data store of the communication system, a history of a key performance indicator describing a network element in the radio access network over a predefined period of time

305

Determining, by a performance application in the communication system, an expected performance value of the network element in a time range based on the history of the key performance indicator, and wherein the expected performance value comprises a permissible range or a threshold of the key performance indicator for the network element

309

Obtaining, by the performance application, a performance rule for the key performance indicator, wherein the performance rule is based on the expected performance value of the network element

311

Determining, by the performance application, a current value of the key performance indicator of the network element at a time within the time range

315

Inputting, by the performance application, the current value of the key performance indicator into the performance rule to output a first determination regarding whether to alert an incident reporting application to generate a performance alarm based on the current value of the key performance indicator being beyond the permissible range or the threshold of the key performance indicator indicated in the expected performance value

317

Validating, by the performance application, the first determination regarding whether to alert the incident reporting application to generate the performance alarm with a false positive factor associated with the key performance indicator to obtain a second determination regarding whether to alert the incident reporting application to generate the performance alarm

319

Generating, by the incident reporting application, the performance alarm based on the second determination and in response to receiving an alert from the performance application, wherein the performance alarm indicates the current value of the key performance indicator and a potential performance-related incident at the NE End

FIG. 3

400

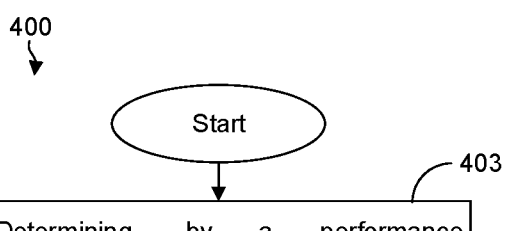

Start

403

Determining, by a performance application in the communication system, an expected performance value of a network element in the radio access network based on a history of a key performance indicator describing the network element over a predefined period of time, wherein the expected performance value comprises a permissible range or a threshold of the key performance indicator for the network element

405

Obtaining, by the performance application, a performance rule for the key performance indicator, wherein the performance rule is based on the expected performance value of the network element

409

Determining, by the performance application, a current value of the key performance indicator of the network element

415

Inputting, by the performance application, the current value of the key performance indicator into the performance rule to determine whether to alert the incident reporting application to generate a performance alarm based on the current value of the key performance indicator being beyond the permissible range or the threshold of the key performance indicator indicated in the expected performance value

417

Generating, by the incident reporting application, the performance alarm and a corresponding incident report based on the current value of the key performance indicator in response to receiving an alert from the performance application to generate the performance alarm based on the current value of the key performance indicator

419

Updating, by the performance application, the expected performance value of the network element and the performance rule based on feedback data received from the network operations center

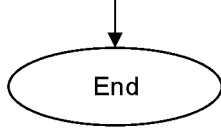

End

5G NR Access Network 554a    gNB 554b    gNB

● ● ●

554c    gNB

559

Application Server

558

5G Core Network

560

Network

METHODS AND SYSTEMS FOR PERFORMANCE-BASED ALARMING AND RESOLUTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication network operators build systems and tools to monitor their networks, to identify network elements (NEs) that need maintenance, to assign maintenance tasks to personnel, and to fix NEs. Operational support systems (OSSs) may be provided by vendors of NEs to monitor and maintain their products. When trouble occurs in NEs, the OSS and/or the NEs may generate an alarm notification. An incident reporting system may be provided by the network operator to track incident reports which may be assigned to employees to resolve one or more pending alarms. A network operation center (NOC) may provide a variety of workstations and tools for NOC personnel to monitor alarms, close incident reports, and maintain the network as a whole. It is understood that operating and maintaining a nationwide communication network comprising tens of thousands of cell sites and other NEs is very complicated.

SUMMARY

In an embodiment, a method for implementing performance-based alarming and resolution in a communication system comprising a radio access network is disclosed. The method comprises obtaining, from a data store of the communication system, a history of a key performance indicator describing a network element in the radio access network over a predefined period of time, and determining, by a performance application in the communication system, an expected performance value of the network element in a time range based on the history of the key performance indicator. The expected performance value comprises a permissible range or a threshold of the key performance indicator for the network element. The method further comprises obtaining, by the performance application, a performance rule for the key performance indicator, wherein the performance rule is based on the expected performance value of the network element, determining, by the performance application, a current value of the key performance indicator of the network element at a time within the time range, and inputting, by the performance application, the current value of the key performance indicator into the performance rule to output a first determination regarding whether to alert an incident reporting application to generate a performance alarm based on the current value of the key performance indicator being beyond the permissible range or the threshold of the key performance indicator indicated in the expected performance value. The method further comprises validating, by the performance application, the first determination regarding whether to alert the incident reporting application to generate the performance alarm with a false positive factor associated with the key performance indicator to obtain a second determination regarding whether to alert the incident reporting application to generate the performance alarm, and generating, by the incident reporting application, the performance alarm based on the second determination and in response to receiving an alert from the performance application, wherein the performance alarm indicates the current value of the key performance indicator and a potential performance-related incident at the network element.

In another embodiment, a communications system implemented in a network comprising a radio access network is disclosed. The communications system comprises a performance application executing on a first computer system and an incident reporting application executing on a second computer system. The performance application is configured to generate an expected performance value of a network element in the radio access network based on a history of a key performance indicator describing the network element over a predefined period of time, wherein the expected performance value comprises a permissible range or a threshold of the key performance indicator for the network element, generate a performance rule for the key performance indicator, wherein the performance rule comprises a logic-based function based on the expected performance value of the key performance indicator, and input a current value of the key performance indicator of the network element into the performance rule to compare the expected performance value of the key performance indicator with the current value of the key performance indicator and determine whether to alert an incident reporting application to generate a performance alarm. The incident reporting application is configured to generate the performance alarm in response to receiving an alert from the performance application to generate the performance alarm based on the current value of the key performance indicator.

In yet another embodiment, a method for implementing performance-based alarming and resolution in a communication system comprising a radio access network is disclosed. The method comprises determining, by a performance application in the communication system, an expected performance value of a network element in the radio access network based on a history of a key performance indicator describing the network element over a predefined period of time. The expected performance value comprises a permissible range or a threshold of the key performance indicator for the network element. The method further comprises obtaining, by the performance application, a performance rule for the key performance indicator, wherein the performance rule is based on the expected performance value of the network element, determining, by the performance application, a current value of the key performance indicator of the network element, and inputting, by the performance application, the current value of the key performance indicator into the performance rule to determine whether to alert an incident reporting application to generate a performance alarm based on the current value of the key performance indicator being beyond the permissible range or the threshold of the key performance indicator indicated in the expected performance value. The method further comprises generating, by the incident reporting application, the performance alarm and a corresponding incident report based on the current value of the key performance indicator in response to receiving an alert from the performance application to generate the performance alarm based on the current value of the key performance indicator, and updating, by the performance application, the expected performance value of the network element and the performance rule based on feedback data received from a network operations center.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is a flow chart of a method according to an embodiment of the disclosure.

FIG. 4 is a flow chart of another method according to an embodiment of the disclosure.

DETAILED DESCRIPTION

Figure 1:
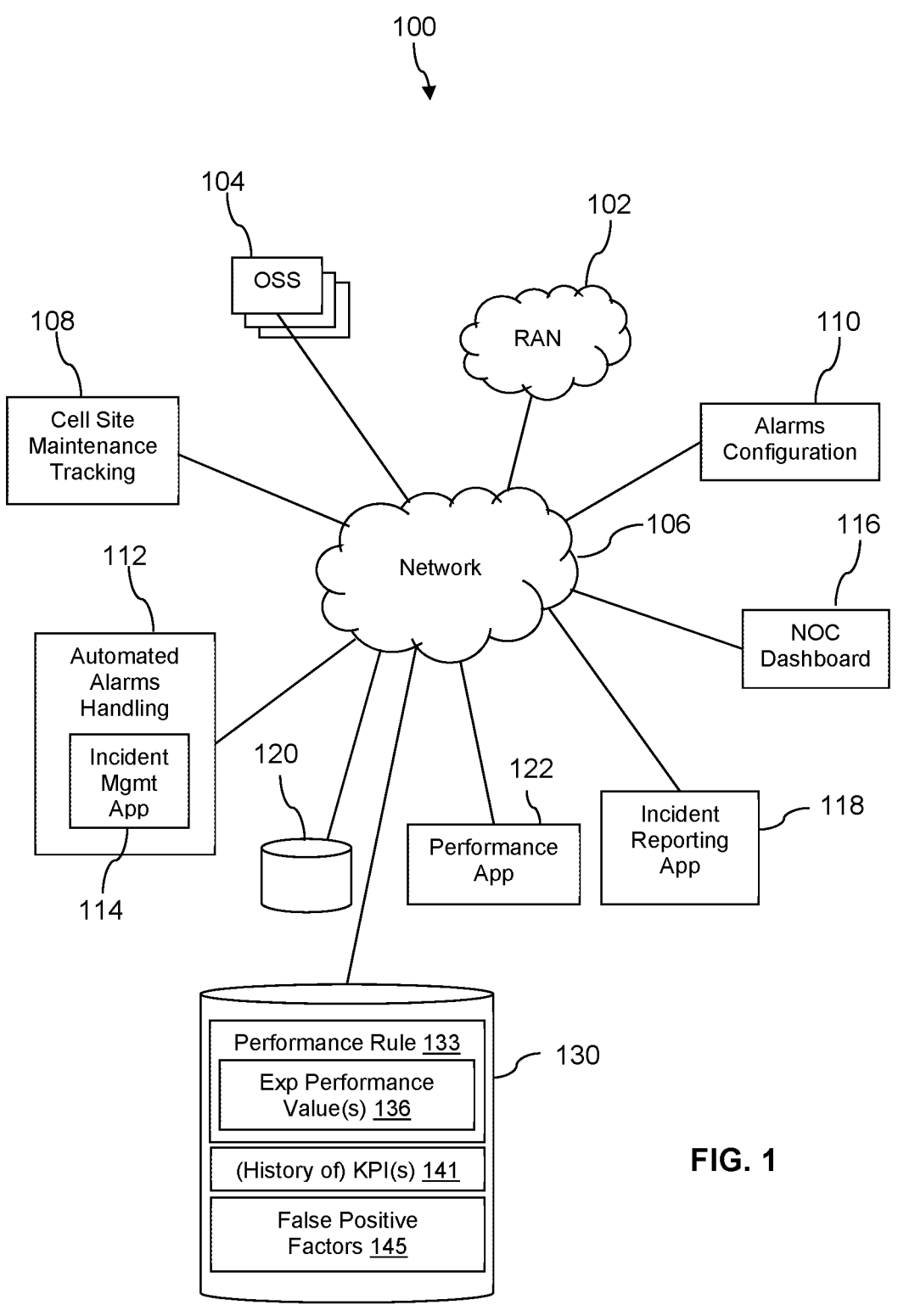
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A communications system may include one or more radio access networks (RANs), each including network elements (NEs) used to transport traffic between a source and destination. The NEs may include, for example, routers, virtual private networks (VPNs), cell sites, towers, macro/micro cells, etc. The communication system may also include an incident reporting system, which may include, for example, one or more OSSs, central monitoring station(s), incident reporting applications, and/or incident management applications, that work together to monitor and resolve hardware and software incidents that may occur at the NEs in the system. For example, each of the NEs in the region may be subject to different types of equipment faults or failures (i.e. incidents), which result in the triggering of alarms that are picked up by OSSs. The alarms may be propagated upwards to an incident reporting application or a central monitoring station, which may be responsible for automatically or manually generating an incident report detailing the failure or outage that caused the alarm. Additional details regarding the incident reporting system is further described herein with reference to FIG. 1.

In some cases, the alarms triggered by the NEs in the system may be based on equipment failures, in which the equipment failures may be a hardware failure or a software failure. For example, cell sites in a RAN may be susceptible to different types of hardware and software failures, which may impact the overall performance of the network. Hardware failures may include, for example, circuit card failures, antenna failures, power supply failures, backhaul link failures, cable failures, temperature related failures, etc. Software failures may include, for example, firmware bugs, software configuration errors, database corruption, software update issues, security vulnerabilities, protocol stack failures, etc. The NEs in the RAN, or an application communicatively coupled to the NEs, may be programmed to detect these failures or conditions leading up to these failures and trigger an alarm accordingly. An incident report may then be created based on the conditions that triggered the alarm. The incident report may be forwarded to the NOC for resolution by a NOC personnel. Alternatively, the incident report may be forwarded directly to a field technician for corrective action, or the incident report may be sent to an automation system to automatically perform corrective actions on the NE to resolve the failure. Therefore, the failures that give rise to the alarms may be equipment-related, in that the alarms are based on a status of a hardware or software feature at the NE triggering the alarm.

However, not all failures and faulty behaviors occurring at NEs in the RAN are based on equipment-related issues. For example, the overall network performance may be heavily impacted by performance-related incidents occurring at the NEs in the RAN. Performance-related incidents at the NEs may include, for example, any type of issue, failure, fault, or incident at an NE causing a performance degradation or outage at the NE. Throughout this disclosure, reference may be made to access failures, dropped calls, and/or sleepy cells as examples of performance-related incidents. However, it should be appreciated, that there are many other types of performance-related incidents as well, such as, for example, call setup failures, handover failures, throughput/latency failures, network unavailability, packet loss, signal strength loss, coverage loss, interference, backhaul performance failures, etc.

Each of these performance-related incidents may be associated with one or more key performance indicators (KPIs), which may be experienced across one or more NEs and may indicate the performance-related incidents. For example, an access failure may be indicated by KPIs, such as, for example, an access failure count across one or more NEs and/or an access failure rate across one or more NEs over a period of time. Similarly, dropped calls may be indicated by KPIs, such as, for example, a dropped call count across one or more NEs and/or a dropped call rate across one or more NEs over a period of time. Sleepy cells may be indicated by KPIs related to the traffic being processed and forwarded across one or more NEs over a period of time, such as, for example, a call or packet count and/or a traffic rate over a period of time.

The NEs in the RAN may not be programmed to trigger alarms based on detected KPIs that may give rise to performance-related incidents across NEs. In some cases, the RAN may include other components and/or applications that may collect KPI data across the NEs in the RAN, and store the KPIs in a data store of the communication system. However, these KPIs may not be monitored twenty-four hours a day, seven days a week, to determine whether a performance-related incident is occurring or is likely to occur in the near future. Moreover, these KPIs may not be analyzed regularly to trigger alarms or the generation of incident reports in a timely manner, such that NOC personnel or other network technicians may address the performance-related incident occurring at the NEs in a reasonable time frame to reduce network and customer impact. Lastly, even if the KPIs were to be analyzed regularly to detect possible performance-related incidents, such an analysis may not account for conditions that may lead to a false positive indication of a performance-related incident. A false positive indication of a performance-related incident may occur when the KPI indicates the occurrence or likelihood of a performance-related incident, but no such performance-related incident may actually be occurring or likely to occur in the near future.

Therefore, the lack of performance-based alarming and incident reporting in the system creates various technical problems. For example, performance-related incidents indicated by KPIs that may not be programmed as part of the incident reporting system may cause outages in the network and greatly degrade the overall performance of the network. That is, dropped calls, access failures, and sleepy cells may cause outages and performance-based incidents, which may in turn heavily decrease the network capacity in the network, while negatively impacting customer experience.

The present disclosure teaches a technical solution to the foregoing technical problem related to network operations and maintenance by implementing performance-based alarming and resolution methods in the network. In some embodiments, the performance-based alarming and resolution methods may be used to generate performance alarms based on KPIs obtained and stored in a data store of the system. A data store in the network may store a history of KPIs describing each of the NEs in the RAN. For example, a history of the KPIs related to access failures, dropped calls, and sleepy cells from over a predefined period of time may be maintained at the data store. The KPIs may be obtained in various manners. For example, the NEs themselves or an application communicatively coupled to the NEs may monitor the KPIs across the NEs in the network. The KPIs may then be sent to the data store for storage in association with an identity or identifier of the NE(s) associated with the KPIs. For example, a cell site (i.e., NE), may be associated with a dropped call count and a dropped call rate (i.e., KPIs), in which case an identifier of the cell site may be stored in the data store in association with the dropped call count and the dropped call rate.

The incident reporting system may additionally include a performance application, which may be programmed to analyze the history of the KPIs across the NEs for a predefined period of time. The performance application may determine an expected performance value of the NEs based on the analysis of the history of the KPIs over the predefined period of time (e.g., 4-6 weeks). For example, the performance application may analyze the history of access failure counts and access failure rates (i.e., KPIs) at a cell site and/or a category of cell sites (i.e., NE or related NEs) to determine an expected access failure count and/or access failure rate (i.e., expected performance value) for a particular time range. The performance application may compute an average of the access failure count over the predefined period of time to compute the expected access failure count (i.e., expected performance value). Similarly, the performance application may compute an average of the access failure rate over the predefined period of time to compute the expected access failure rate (i.e., expected performance value). In addition, suppose that a cell site has a higher access failure count and access failure rate during business hours on Monday through Friday, but a very low access failure count and access failure rate during nights and weekends. These time and day of week ranges may also be considered in determining the expected performance value for NEs based on the history of KPIs for the NEs.

The expected performance value may be a permissible range or a threshold of the KPIs for the NE. A permissible range may define a range of values for a KPI, in which any value within the range may be considered normal operating behavior of the NE during a time period, and which may not alert the system to a potential fault or failure. For example, when the expected performance value is within the permissible range, the expected performance value may be a dropped call count range (i.e., with a minimum and maximum value) and/or a dropped call rate range (i.e., with a minimum and maximum value). Meanwhile, a threshold for the KPIs may define a strict minimum or maximum value associated with the KPI, such that when the KPI is within the limits of the threshold, the NE may be considered to be operating normally for the time period, and an alert may not be needed to signal a potential fault or failure. For example, when the expected performance value is a threshold, the expected performance value may be a maximum dropped call count value and/or a maximum dropped call rate, either of which if exceeded, may trigger the system to take further action, as further described herein.

A current value of the KPIs of the NE may be analyzed, for example, periodically or based on a preset schedule, to determine whether an alert should be generated and sent to the incident reporting application, to generate a performance alarm based on the current value of the KPI. To this end, the performance application may be programmed to execute performance rules, which may be different for different KPIs, different types of KPIs, different NEs, different locations of NEs (e.g., rural or city), different types of NEs, etc. The performance rule may be a logic or code-based function, which may receive the current value of the KPI and one or more other conditions as input, and may output a determination regarding whether to alert the incident reporting application to generate a performance alarm based on the current value of the KPI. The other conditions of the performance rule may also be based on, for example, a location of the NEs, a type of the NEs, a behavior of the NEs, a time of determining the current value of the KPI, an availability of the NE, etc.

The performance rule may also be based on various other constants and other factors. For example, the performance rule may also be based on false positive factors, which may be factors used to indicate whether the current value of the KPI truly indicates a potential fault or failure. For example, the false positive factors may indicate maintenance windows during a maintenance event performed at the NEs, a location of the NEs, an event occurring within a range of the NE, frequency bands through which traffic may be permitted or prohibited from being forwarded through the NEs, a state of the NE (e.g., whether the NE has a history of erratic KPIs with no detectable pattern), etc.

The output of the performance rule may indicate whether to alert the incident reporting application to generate a performance alarm based on the current value of the KPI at least being beyond the permissible range or the threshold of the KPI indicated in the expected performance value. When the output of the performance rule indicates that an alert should be generated, the performance application may generate an alert with details describing the current value of the KPI, and other data that may relate to the current value of the KPI or the NEs. The performance application may transmit the alert to the incident reporting application, which may trigger the incident reporting application to generate a performance alarm including or based on the data received in the alert.

In an embodiment, the incident reporting application may correlate the performance alarm with one or more other alarms, such as, for example, a parent alarm. The other alarms and the parent alarm may all have been triggered by a common outage, failure, or fault occurring across the NEs. For example, an equipment-related failure at a cell site may have triggered an alarm at the cell site, and may have also triggered the performance alarm described above. As another example, another performance-related incident (e.g., sleepy cell) may have triggered a previous performance alarm, and this sleepy cell may have triggered other performance alarms (e.g., dropped call alarms or access failure alarms). In this way, the related alarms or parent alarm may be an equipment alarm or a performance alarm.

The performance alarm itself or the group of related alarms may be processed by the incident reporting application to generate an incident report. The incident report may also include or be based on the details contained in the alert received from the performance application. The incident reporting application may send the incident report to an incident management application, which may triage the incident report and ensure the incident repot is sent to the proper entity (e.g., the NOC, field technician, and/or an automation system) for resolution of the incident described by the incident report.

The incident reporting application may also receive feedback data from the NOC, field technician, and/or the automated system, detailing whether the performance alarm indeed successfully indicated a performance-related incident at the NE or whether the performance alarm indicated a false positive. For example, the feedback data may indicate that troubleshooting was performed at the NEs, and that either a performance-related incident was found, or that no issue was found. If a performance-related incident was indeed found, the feedback data may further indicate corrective actions performed by the NOC, field technician, and/or the automated system that successfully resolved the performance-related incident, or that failed to successfully resolve the performance-related incident. If no issue was found, the feedback data may indicate that the performance alarm was a false positive.

The incident reporting application may transmit the feedback data to the performance application. The performance application may update the expected performance value of the NE and/or the associated performance rule based on the feedback data. For example, the successful and not successful corrective actions taken in response to the performance alarm may be recorded with the associated performance rule, such that future performance alarms raised for the NEs under similar conditions may indicate the successful and not successful corrective actions. The corresponding incident reports may also indicate the successful and not successful corrective actions, such that the NOC personnel, field technician, and/or automated systems may use the successful and not successful corrective actions indicated in the incident report when making decisions on how to respond to the performance alarm. Similarly, when the feedback data indicates that no error was detected, the performance application may update the performance rule to include another false positive factor based on the conditions around the NEs at the time of generating the false positive performance alarm.

In this way, the embodiments for implementing performance-based alarming and resolution serve to greatly increase network capacity by decreasing outages, failures, and faults occurring through the network due to performance-related incidents and failures (as opposed to merely equipment failures). In addition, the embodiments disclosed herein have two layers of verification prior to generating the performing alarm, the first layering being the execution of the performance rule to determine whether to generate the performance alarm, and the second layer being a validation check to ensure that the KPIs signaling a performance-related incident are not indicative of a false positive. These layers serve to ensure that the system is not flooded with unnecessary alarms and incident reports that incorrectly report performance-related incidents at the NEs. Lastly, the embodiments related to packaging related alarms together to create a single incident report, regardless of whether the related alarms are performance-based or equipment-based, also serves to decrease the load on the network that would have otherwise been required to transport multiple incident reports. Therefore, the embodiments disclosed herein increase network capacity and throughput, while conserving networking and processing resources in the system.

Turning now to FIG. 1, a communication system 100 is described. In an embodiment, the communication system 100 comprises a radio access network (RAN) 102, a plurality of operational support systems (OSSs) 104, a network 106, a cell site maintenance tracking system 108, an alarms configuration system 110, an automated alarms handling system 112 that executes an incident management application 114, a network operation center (NOC) dashboard system 116, an incident reporting system (or application) 118, and a data store 120. In an embodiment, communication system 100 may be a telecommunications carrier networking comprising the RAN 102.

The RAN 102 comprises a plurality of cell sites and backhaul equipment. In an embodiment, the RAN 102 comprises tens of thousands or even hundreds of thousands of cell sites. The cell sites may comprise electronic equipment and radio equipment including antennas. The cell sites may be associated with towers or buildings on which the antennas may be mounted. The cell sites may comprise a cell site router (CSR) that couples to a backhaul link from the cell sites to the network 106. The cell sites may provide wireless links to user equipment (e.g., mobile phones, smart phones, personal digital assistants, laptop computers, tablet computers, notebook computers, wearable computers, headset computers) according to a 5G, a long-term evolution (LTE), code division multiple access (CDMA), or a global system for mobile communications (GSM) telecommunication protocol. In an embodiment, the OSSs 104 comprises tens or even hundreds of OSSs. The network 106 comprises one or more public networks, one or more private networks, or a combination thereof. The RAN 102 may from some points of view be considered to be part of the network 106 but is illustrated separately in FIG. 1 to promote improved description of the system 100.

The cell site maintenance tracking system 108 is a system implemented by one or more computers. Computers are discussed further hereinafter. The cell site maintenance tracking system 108 is used to track maintenance activities on NEs (e.g., cell site equipment, routers, gateways, and other network equipment). When a NE is in maintenance, alarms that may occur on the NE may be suppressed, to avoid unnecessarily opening incident reports related to such alarms that may be generated because of unusual conditions the equipment may undergo pursuant to the maintenance activity. When a maintenance action is completed, maintenance personnel may be expected to check and clear all alarms pending on the subject NE before the end of the time scheduled for the maintenance activity.

The alarm configuration system 110 is a system implemented by one or more computers. The alarm configuration system 110 allows users to define rules and instructions for handling alarms, for example rules for automatic processing of alarms by the automated alarms handling system 112. The alarm configuration system 110 may define rules for when an alarm leads to automatic generation of an incident report, as described herein.

Alarms are flowed up from NEs of the RAN 102 via the OSSs 104 to be stored in the data store 120. The NOC dashboard 116 can access the alarms stored in the data store 120 and provide a list of alarms on a display screen used by NOC personnel. NOC personnel can manually open incident reports on these alarms. In an embodiment, the NOC dashboard 116 provides a system that NOC personnel can use to monitor health of a carrier network (e.g., monitor the RAN 102 and at least portions of the network 106), to monitor alarms, to drill down to get more details on alarms and on NE status, to review incident reports, and to take corrective actions to restore NEs to normal operational status. The NOC dashboard 116 may interact with the data store 120, with the cell site maintenance tracking system 108, the OSSs 104, the RAN 102, and other systems. NOC personnel can use the NOC dashboard 116 to manually create incident reports based on alarms reviewed in a user interface of the NOC dashboard 116.

The incident reporting application (or system) 118 can monitor the alarms stored in the data store 120 and automatically generate incident reports on these alarms based in part on the alarm configurations created and maintained by the alarms configuration system 110. For example, an alarm configuration rule defined by the alarm configuration system 110 may indicate that an incident report is not to be opened related to a specific alarm until the alarm has been active for a predefined period of time, for example for five minutes, for ten minutes, for fifteen minutes, for twenty minutes, for twenty-five minutes, or some other period of time less than two hours. The time criteria for auto generation of incident reports may be useful to avoid opening and tracking incidents that are automatically resolved by other components of the system 100, as described further hereinafter. Incident reports may be referred to in some contexts or by other communication service providers as tickets or trouble tickets.

The incident management application 114 may operate upon incident reports in a sequence of processes. In an embodiment, the incident management application 114 may perform automated triage on incident reports that includes automated enrichment of alarms and/or incident reports, automated dispatch to field operations personnel for some incident reports, and automated testing. Automated enrichment may comprise looking-up relevant information from a plurality of disparate sources and attaching this relevant information to the incident report. The looked-up information may comprise local environmental information such as weather reports, rainfall amounts, temperature, wind. The looked-up information may comprise logs of recent maintenance activities at the affected NE.

The automated triage process may involve determining a probable root cause for the incident and adding this to the incident report during the enrichment action. The probable root causes may be categorized as related to electric power, backhaul (e.g., transport), maintenance, or equipment (e.g., RAN hardware related), but within these general categories it is understood there may be a plurality of more precise probable root causes. The automated triage process can assign an incident report to personnel for handling based on its determination of the probable root cause of the incident report.

In an embodiment, the incident management application 114 may automatically close an incident report when NE status warrants such automated closure. Automated closure may happen because NOC personnel have taken manual corrective action to restore proper function of one or more NEs. Automated closure may happen because the incident management application 114 determines that the incident report was created pursuant to a maintenance action that extended beyond the scheduled maintenance interval and that the scheduled maintenance interval was later extended, but extended after a related incident report had already been generated. The incident management application 114 may perform automated remediation of alarm conditions associated with incident reports. For example, cell sites can be reset to restore operation and clear alarmed conditions. For example, cell sites can be locked and unlocked to restore operation and clear alarmed conditions. For example, cell sites may be resynched with GPS. For example, a software or firmware update may be pushed to cell sites.

In an embodiment, the communication system 100 may be enhanced to implement performance-based alarming and resolution using a performance application 122. The performance application 122 may include instructions stored in a memory of a computer system, which when executed, by the computer system cause the performance application 122 to perform the steps disclosed herein. The performance application 122 may execute on its own computer system or on a NOC dashboard computer, automated alarms handling computer, or other computer system in the communication system 100.

In an embodiment, the communication system 100 may include a data store 130, comprising one or more memories storing KPIs 141 (or a history of KPIs 141) for each of the NEs in the RAN 102. Each NE may be associated with multiple different KPIs 141, at different times during different days of the week, months of the year, or time periods. The data store 130 may store an identification or identifier of each NE in association with each of the KPIs 141 and a time period (e.g., time of day/month/year) that the NE performed according to the KPIs 141. The KPIs 141 may be obtained in various manners. For example, the NEs themselves, the performance application 122, or another application communicatively coupled to the NEs may monitor the KPIs 141 across the NEs in the RAN 102. The KPIs 141 may then be sent to the data store 130 for storage in association with an identity or identifier of the NE(s) associated with the KPIs 141.

The data store 130 may also store performance rules 133. A performance rule 133 may be a logic or code programmed into a computer to cause the computer to perform a function by obtaining (e.g., receiving, detecting, determining, or monitoring) a current value of KPI 141 and one or more other factors as input, and outputting a determination as to whether to alert the incident reporting application 118 to generate one or more performance alarms accordingly. The performance application 122 may use different performance rules 133 for different NEs and/or different KPIs 141 associated with each of the NEs. For example, a first performance rule 133 may be used for dropped call KPIs 141 for a first NE, and a second performance rule 133 may be used for access failure KPIs 141 for the first NE. The performance application 122 may use different performance rules 133 based on a time of obtaining a current value of a KPI 141.

The performance rule 133 may be executed based on the expected performance value 136. The performance application 122 may determine the expected performance value 136 based on the history of the KPIs 141 stored at the data store 130. The expected performance value 136 may be a permissible range or a threshold of the KPIs 141 for NE(s). A permissible range may define a range of values for the KPIs 141, which may be considered normal operating behavior of the NEs within a time period, and which may not alert the system to a potential performance-related incident. Meanwhile, a threshold for the KPIs may define a strict minimum or maximum value associated with the KPI, such that when the KPI is within the limits of the threshold, the NE may be considered to be operating normally for the time range, and an alert may not be needed to signal a potential performance-related incident.

The performance rule 133 may also be executed based on the other factors, which may sometimes be received as input or may be pre-programmed with the performance rule 133. For example, the other factors may include a location of the NE (e.g., rural or in the city), an environment surrounding the NE (e.g., physical obstructions nearby, etc.), a time of obtaining a current value of the KPI (e.g., business hours Monday-Friday, nights, or weekends), historical behavior of the NE (e.g., patterned actions or random actions), false positive factors 145, etc.

The false positive factors 145 may be factors used to indicate whether the current value of the KPI truly indicates an issue occurring at the NE, or not. For example, the false positive factors may indicate maintenance windows during a maintenance event performed at the NEs, a location of the NEs, an event occurring within a range of the NE, frequency bands through which traffic may be permitted or prohibited from being forwarded through the NEs, a state of the NE (e.g., whether the NE has a history of erratic KPIs with no detectable pattern), etc. In some cases, the false positive factors may be part of the performance rule 133. Alternatively, the false positive factors 145 may be applied after the performance rule 133 is executed using the expected performance value 136, to apply another layer of validation to the output of the performance rule 133. For example, the current value of a KPI 141 at an NE may be provided as input into the performance rule 133. The performance rule 133 may, at least in part, perform a comparison between the expected performance value 136 of the NE over a time period with the current value of the KPI 141 for a predefined duration, to output an alert determination. When the alert determination indicates that the incident reporting application 118 should be alerted to generate a performance alarm, the performance application 122 may instead first perform a false positive verification check. In performing the false positive verification check, the performance application 122 may compare the conditions around the current value of the KPI 141 for the predefined duration with the false positive factors 145 to validate or discard the alert determination. For example, if the false positive factor 145 of the KPI 141 at the NE indicates that the historical behavior of the NE during the predefined duration is actually normal behavior for the NE then the performance application 122 may discard the alert determination. If not, the performance application 122 may proceed to alert the incident reporting application 118 to generate a performance alarm and incident report accordingly, for performance-based alarming and resolution.

Figure 2A:
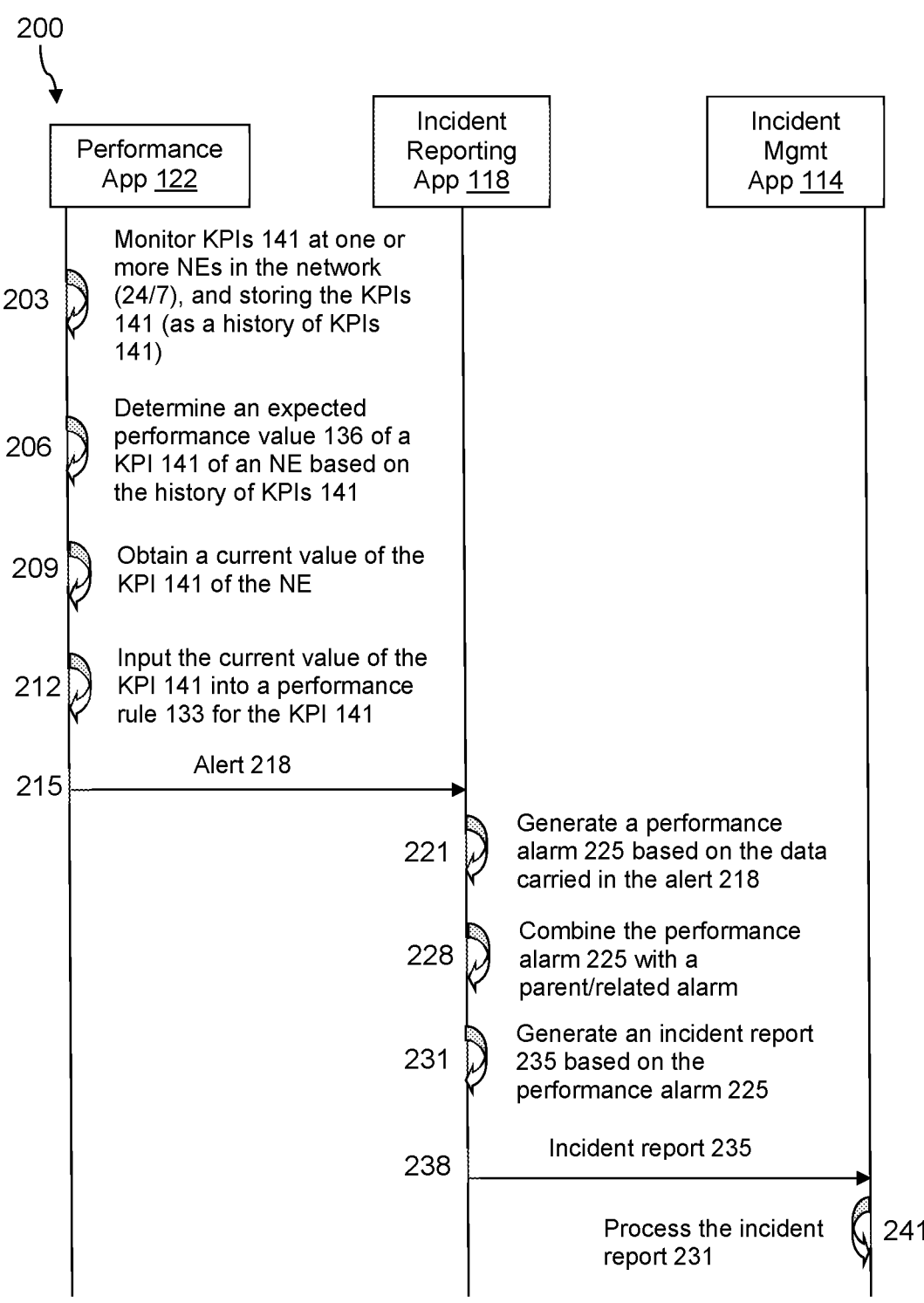
FIGS. 2A and 2B illustrate message sequence diagrams performed by the system of FIG. 1 according to an embodiment of the disclosure.
Figure 2B:
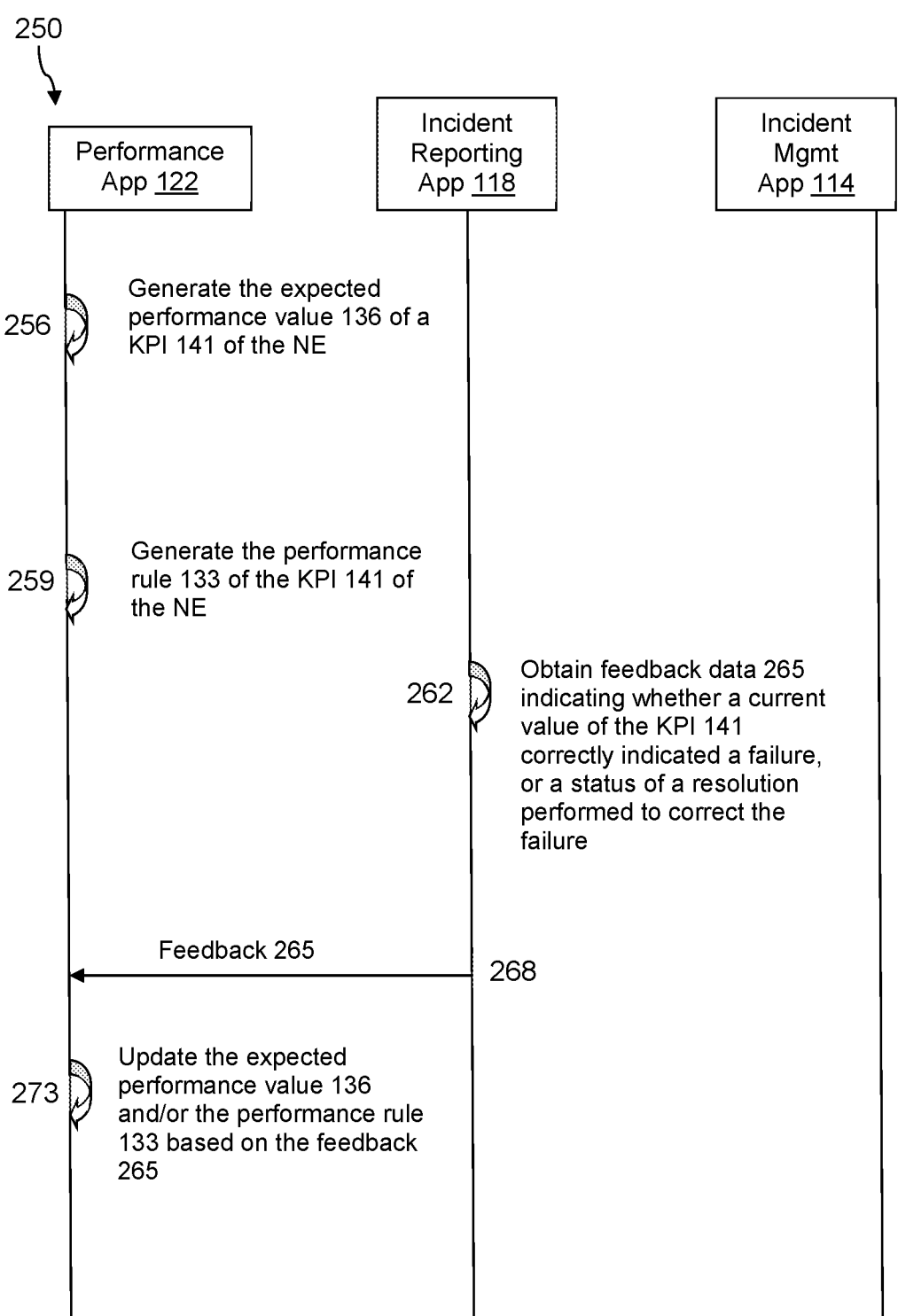

Referring now to FIGS. 2A-2B, message sequence diagrams illustrating methods 200 and 250 are described. Turning now specifically to FIG. 2A, a message sequence diagram illustrating method 200 is described. Method 200 may be performed by at least the performance application 122, the incident reporting application 118, and/or the incident management application 114 from the communication system 100 of FIG. 1. Method 200 may be performed when the history of KPIs 141 are collected and stored at the data store 130.

At step 203, the performance application 122 may monitor KPIs 141 across the NEs in the RAN 102. The performance application 122 may monitor the KPIs 141 constantly, according to a predefined schedule, during predetermined intervals, or in response to requests from RAN operators. For example, the performance application 122 may constantly monitor the KPIs 141 across the NEs in the RAN 102, and record the KPIs 141 in the data store 130 based on a time period of the KPI 141. In this example, an NE may have a first KPI 141 during business hours (9 am-5 pm), Monday-Friday, and a second KPI 141 during nights and weekends. The data store 130 may include an entry for the NE indicating the first KPI 141 during business hours, Monday-Friday, and a second entry for the NE indicating the second KPI 141 during nights and weekends. The performance application 122 may also monitor and record the KPIs 141 according to a predefined schedule, such as, for example, every thirty seconds or every minute. In this case, the performance application 122 may record different KPI entries for each predefined interval, to keep a detailed record of the KPIs 141 associated with the NE over the course of time.

The performance application 122 may monitor the KPIs 141 across the NEs in the RAN twenty-four hours a day, seven days a week (as opposed to only during business hours). The KPIs 141 recorded in the data store 130 may each indicate a time associated with the recorded KPI 141, providing a detailed history of the KPIs 141 across the NEs in the RAN 102.

While FIG. 2A describes the performance application 122 as monitoring and storing the KPIs 141 in the data store 130, the KPIs 141 may be obtained in a variety of other manners as well, and should not be limited herein. For example, another monitoring application, separate from the performance application 122, may be responsible for monitoring and storing the KPIs 141 at the data store 130. Alternatively, the NEs in the RAN 102 may detect the KPIs 141 individually and send the KPIs 141 to the data store 130 for storage.

As another example, instead of monitoring and recording the KPIs 141, the performance application 122 may instead receive the KPIs 141 from various vendors or manufacturers associated with each of the NEs when the vendors or manufacturers are responsible for monitoring the KPIs 141 for the respective NEs. In this case, the performance application 122 may receive the KPIs 141 from various sources, process the KPIs 141 into a standardized format (e.g., transform, normalize, convert the KPIs 141) for storage at the data store 130, such that the KPIs 141 received from the different sources may be utilized in a standard, unified manner that is source agnostic.

At step 206, the performance application 122 may then determine (e.g., compute) an expected performance value 136 of one or more NEs in the RAN 102 based on the history of the KPIs 141. The performance value 136 may be related to a single NE (e.g., cell site) in the RAN 102, multiple different components in the NE, multiple related NEs (e.g., similar types of cell sites, different NEs in the same location vicinity), etc.

For example, the performance application 122 may analyze the history of access failure counts and access failure rates (i.e., KPIs 141) at a cell site to determine an expected access failure count and/or access failure rate (i.e., expected performance value 136) for a particular time range. (to determine whether the cell site is experiencing an access failure performance-related incident). As another example, the performance application 122 may analyze the history of dropped call counts and dropped call rates (i.e., KPIs 141) at a cell site to determine an expected dropped call count and/or dropped call rate (i.e., expected performance value 136) for a particular time range (to determine whether the cell site is experiencing a dropped call performance-related incident). As yet another example, the performance application 122 may analyze a traffic flow rate (i.e., KPI 141) at a cell site and/or a category of cell sites (i.e., NE or related NEs) to determine an expected traffic flow rate (i.e., expected performance value 136) for a particular time range (to determine whether the cell site is a sleepy cell (e.g., performance-related incident).

The expected performance value 136 may be a permissible range or a threshold of the KPI(s) 141 for the NE(s). A permissible range may define a range of values for the KPI 141, which may be considered normal operating behavior of the NE for the time range, and which may not alert the system to a potential performance-related incident. For example, when the expected performance value 136 is within the permissible range, the expected performance value 136 may be a range of a type of count (i.e., with a minimum and maximum value) and/or a range of a certain of rate (i.e., with a minimum and maximum value). Meanwhile, a threshold for the KPIs 141 may define a strict minimum or maximum value associated with the KPI 141, such that when the KPI 141 is within the limits of the threshold, the NE may be considered to be operating normally for the time range, and an alert may not be needed to signal a potential fault or failure. For example, when the expected performance value 136 is a threshold, the expected performance value 136 may be a maximum count value and/or a maximum rate, either of which if exceeded, may trigger an alert to be sent to the incident reporting application 118, as further described herein.

In an embodiment, the performance application 122 may also consider other factors when determining the expected performance value of the KPI 141 of an NE. For example, the expected performance value 136 may also be based on a time of obtaining the current value of the KPI 141, such that only the history of KPIs 141 within a similar timing are analyzed when determining the expected performance value 136 of the KPI 141 of the NE. For example, the expected performance value 136 may be an average of the KPIs 141 experienced at the NE in the past at the same time or around the same time range as the time of obtaining the current value of the KPI 141. Said another way, the history of KPIs 141 to consider when determining the expected performance value 136 may include the KPIs 141 of the NE that have previously been recorded at the same time or around the same time (e.g., time of day, day of week, week of month, holidays, weekends, and ranges of such). The considered KPIs 141 may be only the ones collected over a predefined time period, such as, for example, over the course of the past 4-6 weeks.

For example, the expected performance value 136 may also be based on a location of the NE, such that only the history of KPIs 141 within a similar location or area are analyzed when determining the expected performance value 136 of the KPI 141 of the NE. For example, the expected performance value 136 may be an average of the KPIs 141 within a predefined distance of the NE, in addition to the similar time range mentioned above. The history of the KPIs 141 considered for this analysis may similarly go back over a predefined period of time, such as, for example, over the course of 4-6 weeks.

At step 209, the performance application 122 may obtain a current value of the KPI 141 of the NE. In an embodiment, the performance application 122 may obtain the current value of the KPI 141 as part of the monitoring step 203 (i.e., in the process of constantly monitoring and recording KPIs 141 of the NEs). In another embodiment, the performance application 122 may obtain the current value of the KPI 141 of the NE in response to a trigger event, which may be, for example, a request from an operator or engineer of the RAN 102, an indication that other alarm(s) have been triggered at the NE that may also cause performance-related incidents, etc.

At step 212, the performance application 122 may input the current value of the KPI 141 into a performance rule 133 for the KPI 141 and/or the NE. The performance rule 133 may be uniquely programmed for the KPI 141, the NE, and/or the time period during which the current value of the KPI 141 was determined at step 209. The performance application 122 may execute the performance rule 133, and in doing so may compare the current value of the KPI 141 with the expected performance value 136 of the KPI 141. When the current value of the KPI 141 is within the permitted range or limits of the threshold defined in the expected performance value 136 of the KPI 141, the performance application 122 may determine that NE is functioning normally as expected during the time when the current value of the KPI 141 was obtained at step 209. In this case, method 200 may end and the performance application 122 may continue monitoring and recording KPIs 141.

In contrast, when the current value of the KPI 141 is outside or not within the permitted range or limits of the threshold defined in the expected performance value 136 of the KPI 141, the performance application 122 may execute the performance rule to output a first determination. The first determination may indicate whether NE is experiencing or about to experience a performance-related incident during the time when the current value of the KPI 141 was obtained at step 209.

In some cases, after this first determination, the performance application 122 may analyze the false positive factors 145 related to the NE and/or the KPI 141 to validate whether the first determination output by the performance rule 133 is indeed accurate or whether the first determination indicates a false positive. A false positive may occur when the output first determination output by the performance rule 133 incorrectly indicates that the NE is experiencing or about to experience a performance-related incident. The performance application 122 may perform this false positive check as an additional validation layer after executing the performance rule 133 to determine, based on the false positive factors 145, a second determination indicating whether the NE is experiencing or about to experience a performance-related incident.

In an embodiment, each NE and/or each KPI 141 of each NE may be associated with certain false positive factors 145, indicating when a seemingly abnormal KPI 141 is actually normal for the NE. For example, suppose that the current value of the KPI 141 at a first time is far lower than the expected performance value 136 of the KPI 141 at the first time, but the false positive factors 145 indicate that a maintenance event was being performed at the NE during the first time. This may indicate that the current value of the KPI 141 does not actually indicate that the NE is experiencing or about to experience a performance-related incident, but instead merely indicates that a maintenance event is being performed at the NE at the first time.

Similarly, suppose that the current value of the KPI 141 at a first time is far higher than the expected performance value 136 of the KPI 141 at the first time, but the false positive factors 145 indicate that the NE behaves somewhat erratically during this first time. This may indicate that the current value of the KPI 141 does not actually indicate that the NE is experiencing or about to experience a performance-related incident, but instead merely indicates that this is a time during which the NE does not really exhibit a patterned behavior that may be monitored and predicted with accuracy. In this way, the false positive factors 145 may also indicate other conditions, such as, for example, frequency bands that are used for traffic or are used as standby, customized cell sites serving smaller areas, locations of NEs in which traffic may sometimes resemble a sleepy cell, etc. In this way, the performance application 122 may use these false positive factors 145 to additionally validate whether the output of the performance rule 133 is indeed accurate.

In this case, method 200 may proceed to step 215, in which the performance application 122 may transmit an alert 218 to the incident reporting application 118. The alert 218 may be a message including various details, such as, for example, an identification of the NE(s), a location of the NE(s), a time of determining the current value of the KPI 141 of the NE(s), the current value of the KPI 141 of the NE(s), an expected performance value 136 of the KPI 141 of the NE(s), and/or any other data related to the KPIs 141 and/or the NE(s).

At step 221, after the incident reporting application 118 receives the alert 218, the incident reporting application 118 may generate a performance alarm 225 based on or including the data carried in the alert 218. For example, the performance alarm 225 may include various details, such as, for example, an identification of the NE(s), a location of the NE(s), a time of determining the current value of the KPI 141 of the NE(s), the current value of the KPI 141 of the NE(s), an expected performance value 136 of the KPI 141 of the NE(s), and/or any other data related to the KPIs 141 and/or the NE(s). In one embodiment, the performance alarm 225 may simply include the current value of the KPI 141 of the NE. In either case, the performance alarm 225 may include a flag or bit set to indicate that the alarm 225 is based on a potential performance-related incident (as opposed to an equipment-related failure that would give rise to pre-programmed alarms at the NEs).

At step 228, the incident reporting application 118 may combine or correlate the performance alarm 225 with a parent or related alarm, if applicable. The parent or related alarm may have been triggered in response to a similar outage, failure, or fault occurring across the NEs. For example, an equipment-related failure at a cell site may have triggered an alarm at the cell site, and may have also given rise to the performance alarm 225. As another example, another performance-related failure (e.g., sleepy cell) may have triggered a previous performance alarm, and this performance-related failure may have triggered other performance alarms (e.g., dropped call alarms or access failure alarms). In this way, the related alarms or parent alarm may be an equipment alarm or a performance alarm.

At step 231, the incident reporting application 118 may generate an incident report 235 based on the performance alarm 225 itself and/or the parent/related alarms. For example, when the parent/related alarms and the performance alarm 225 have been determined by the incident reporting application 118 to be caused by a common outage, failure, or fault at one or more NEs, the incident reporting application 118 may generate one incident report 235 to address all of the parent/related alarms and the performance alarm 225. In contrast, when the performance alarm 225 is considered as a standalone alarm, the incident reporting application 118 may generate the incident report 235 with details regarding the conditions that triggered the performance alarm 225. For example, the incident report 235 may include similar details as the alert 218 and/or the performance alarm 225, in that the incident report 235 may also include, for example, an identification of the NE(s), a location of the NE(s), a time of determining the current value of the KPI 141 of the NE(s), the current value of the KPI 141 of the NE(s), an expected performance value 136 of the KPI 141 of the NE(s), and/or any other data related to the KPIs 141 and/or the NE(s).

At step 238, the incident reporting application 118 may transmit the incident report 235 to the incident management application 114. The incident management application 114 may triage the incident report 235 as described herein. The incident management application 114 may also transmit the incident report 235 to the appropriate resolving party or system, such as, for example, the NOC, field technician, and/or automation system for resolution of the potential performance-related incident described by the incident report 235.

Turning now to FIG. 2B, a message sequence diagram illustrating method 250 is described. Method 250 may be performed by at least the performance application 122, the incident reporting application 118, and/or the incident management application 114 from the communication system 100 of FIG. 1. Method 250 may be performed when the history of KPIs 141 are collected and stored at the data store 130.

At step 256, the performance application 122 may generate the expected performance value 136 of a KPI 141 of the NE, which may be performed in a manner similar to that described above with respect to step 206 of FIG. 2A. At step 259, the performance application 122 may generate the performance rule 133 of the KPI 141. As mentioned above, a performance rule 133 may be a logic or code programmed to perform a function by receiving a current value of KPI 141 and one or more other factors as input, and outputting a determination as to whether to alert the incident reporting application 118 to generate performance alarm accordingly. The performance rule 133 may be based on the expected performance value 136 generated at step 256, and other conditions that may be related to the KPI 141 and/or the NE associated with the performance rule 133. The performance rule 133 may, at least in part, include logic for comparing a current value of the KPI 141 of an NE with the expected performance value 136 of the KPI 141 of the NE.

In an embodiment, the performance rule 133 may consider factors such as, for example, the location of the NE, an environment of the NE, a time of receiving the current value of the KPI 141, an event occurring within an area covered by the NE, possible physical obstructions around the NE, etc. Other examples of the factors that may be included in the performance rule 133 as logic or part of the function are further described above with respect to step 212 of FIG. 2A. In an embodiment, the performance rule 133 may also consider the false positive factors 145, such that the logic or part of the function may include some validation determination based on potential false positive factors 145 associated with the KPI 141 and/or NE being analyzed by the performance rule 133.

In some embodiments, the incident reporting application 118 may monitor the success and/or failure of the steps taken towards resolution of the possible performance-related incident. At step 262, the incident reporting application 118 may obtain feedback data 265, for example, from the NOC, field technician, and/or the automated system, detailing whether the performance alarm 225 indeed successfully indicated an incident (e.g., failure, fault, issue, or other problem) at the NEs or whether the performance alarm 225 indicated a false positive. For example, the feedback data 265 may indicate that troubleshooting was performed at the NEs, and that either a performance-related incident was found, or that no issue was found. If a performance-related incident was indeed found, the feedback data 265 may further indicate corrective actions performed by the NOC, field technician, and/or the automated system that successfully corrected the performance-related incident, or that failed to successfully correct the performance-related incident. If no issue was found, the feedback data 265 may indicate that the performance alarm was a false positive because a performance-related incident was not found at the NE. In this way, the feedback data 265 may indicate whether a current value of the KPI 141 correctly indicated the performance-related incident and/or the feedback data 265 may indicate a status of the resolution performed to correct the performance-related incident.

At step 268, the incident reporting application 118 may transmit the feedback data 265 to the performance rule 133. At step 273, the performance application 122 may update the expected performance value 136 of the KPI 141 of NE and/or the associated performance rule 133 based on the feedback data 265. For example, the successful and not successful corrective actions taken in response to the performance alarm 225 may be recorded with the associated performance rule 133, such that future performance alarms 225 raised at the NEs under similar conditions may indicate the successful and not successful corrective actions. The corresponding incident reports 235 may also indicate the successful and not successful corrective actions, such that the NOC personnel, field technician, and/or automated systems may use the successful and not successful corrective actions indicated in the incident report 235 when making decisions on how to respond to the performance alarm 225. Similarly, when the feedback data 265 indicates that no error was detected, the performance application 122 may update the performance rule to include another false positive factor 145 based on the conditions around the NEs at the time of generating the performance alarm 225.

Turning now to FIG. 3, a method 300 is described. In an embodiment, method 300 may be a method for implementing performance-based alarming and resolution in a communication system 100 comprising a RAN 102. Method 300 may be performed by the performance application 122 and the incident reporting application 118.

At step 303, method 300 comprises obtaining, from a data store 130 of the communication system 100, a history of a KPI 141 describing a NE in the RAN 102 over a predefined period of time. At step 305, method 300 comprises determining, by a performance application 122 in the communication system 100, an expected performance value 136 of the NE in a time range based on the history of the KPI 141, in which the expected performance value 136 comprises a permissible range or a threshold of the KPI 141 for the NE.

At step 309, method 300 comprises obtaining, by the performance application 122, a performance rule 133 for the KPI 141. In an embodiment, the performance rule 133 is based on the expected performance value 136 of the NE. At step 311, method 300 comprises determining, by the performance application 122, a current value of the KPI 141 of the NE at a time within the time range.

At step 315, method 300 comprises inputting, by the performance rule 133, the current value of the KPI 141 into the performance rule 133 to output a first determination regarding whether to alert the incident reporting application 118 to generate a performance alarm 125 based on the current value of the KPI 141 being beyond the permissible range or the threshold of the KPI 141 indicated in the expected performance value 136. At step 317, method 300 comprises validating, by the performance application 122, the first determination regarding whether to alert the incident reporting application 118 to generate the performance alarm 125 with a false positive factor 145 associated with the KPI 141 to obtain a second determination regarding whether to alert the incident reporting application 118 to generate the performance alarm 125. At step 319, method 300 comprises generating, by the incident reporting application 118, the performance alarm 225 based on the second determination and in response to receiving an alert 218 from the performance application 122. In an embodiment, the performance alarm 225 indicates the current value of the KPI 141 and a potential performance-related incident at the NE.

Method 300 may comprise other attributes and steps not otherwise shown in the flowchart of FIG. 3. In an embodiment, the KPI describing the NE may be associated with at least one of access failures at the NE, dropped calls at the NE, or a sleepy cell associated with the NE. In an embodiment, the false positive factor 145 may be based on at least one of a maintenance windows during which a maintenance event is performed on the NE, a location of the NE, an event occurring within range of the NE, frequency bands through which traffic is permitted to be forwarded by the NE, or a state of the NE. In an embodiment, the performance rule 133 is further based on at least one of a location of the NE or the time of determining the current value of the KPI 141. In an embodiment, method 300 may further comprise obtaining, from the data store 130 of the network, a second history of a second KPI 141 describing the NE over the predefined period of time, and determining, by the performance application 122, a second expected performance value 136 of the NE in the time range based on the second history of the second KPI 141, wherein the second expected performance value 136 comprises a permissible range or a threshold of the second KPI 141 for the NE, wherein the performance rule 133 is further based on the second expected performance value of the NE. In an embodiment, method 300 may further comprise generating, by the incident reporting application 118, an incident report 135 based on the performance alarm 125, wherein the incident report 135 is forwarded to the NOC or to an automated resolution system to correct the potential performance-related incident at the NE. In an embodiment, method 300 may further comprise combining, by the incident reporting application 118, the performance alarm 125 with a parent alarm to create a single incident report 135 for both the performance alarm 125 and the parent alarm, wherein the parent alarm comprises at least one of another performance alarms or an equipment alarm.

Turning now to FIG. 4, a method 400 is described. In an embodiment, method 400 may be a method for implementing performance-based alarming and resolution in a communication system 100 comprising a RAN 102. Method 400 may be performed by the performance application 122 and the incident reporting application 118.

At step 403, method 400 comprises determining, by a performance application 122 in the communication system 100, an expected performance value 136 of a NE in the RAN 102 based on a history of a KPI 141 describing the NE over a predefined period of time. In an embodiment, the expected performance value 136 comprises a permissible range or a threshold of the KPI 141 for the NE.

At step 405, method 400 comprises obtaining, by the performance application 122, a performance rule 133 for the KPI 141. In an embodiment, the performance rule 133 is based on the expected performance value 136 of the NE. At step 409, method 400 comprises determining, by the performance application 122, a current value of the KPI 141 of the NE.

At step 415, method 400 comprises inputting, by the performance application 122, the current value of the KPI into the performance rule 133 to determine whether to alert an incident reporting application 118 to generate a performance alarm 125 based on the current value of the KPI being beyond the permissible range or the threshold of the KPI 141 indicated in the expected performance value 136. At step 417, method 400 comprises generating, by the incident reporting application 118, the performance alarm 225 and a corresponding incident report 235 based on the current value of the KPI 141 in response to receiving an alert from the performance application 122 to generate the performance alarm 225 based on the current value of the KPI 141. At step 419, method 400 comprises updating, by the performance application 122, the expected performance value 136 of the NE and the performance rule 133 based on feedback data 265 received from the NOC.

Method 400 may comprise other attributes and steps not otherwise shown in the flowchart of FIG. 4. In an embodiment, the feedback data from the NOC indicates at least one of whether the current value of the KPI 141 correctly indicated a performance-related incident at the NE at the NE or a status of a resolution performed to correct the performance-related incident at the NE. In an embodiment, the KPI 141 describing the NE is associated with at least one of access failures at the NE, dropped calls at the NE, or a sleepy cell associated with the NE. In an embodiment, the performance rule 133 is further based on at least one of a location of the NE or the time of determining the current value of the KPI 141. In an embodiment, method 400 may further comprise obtaining, from the data store 130 of the communication system 100, a second history of a second KPI 141 describing the NE over the predefined period of time, and determining, by the performance application 122, a second expected performance value 136 of the NE the time range based on the second history of the second KPI 141, wherein the second expected performance value 136 corresponds to the second KPI 141 describing the NE, and wherein the second expected performance value 136 comprises a permissible range or a threshold of the second KPI 141 for the NE, wherein the performance rule 133 is further based on the second expected performance value 136 of the NE. In an embodiment, method 400 may further comprise comparing, by the performance application 122, the current value of the KPI 141 with one or more false positive factors 145 prior to determining whether to alert the incident reporting application 118 to generate the performance alarm 125.

Figure 5A:
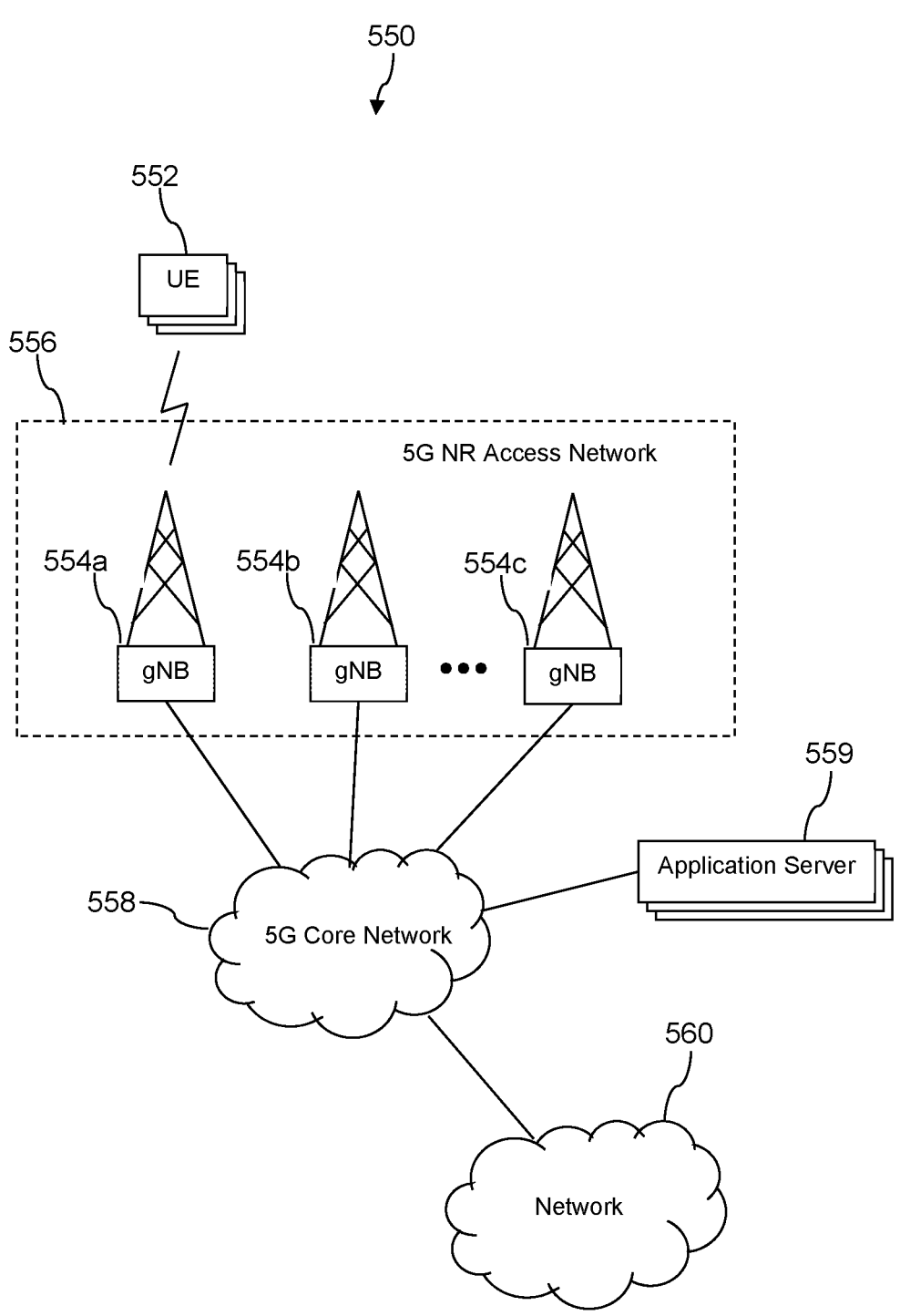
FIG. 5A and FIG. 5B are block diagrams of a 5G network according to an embodiment of the disclosure.

Turning now to FIG. 5A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
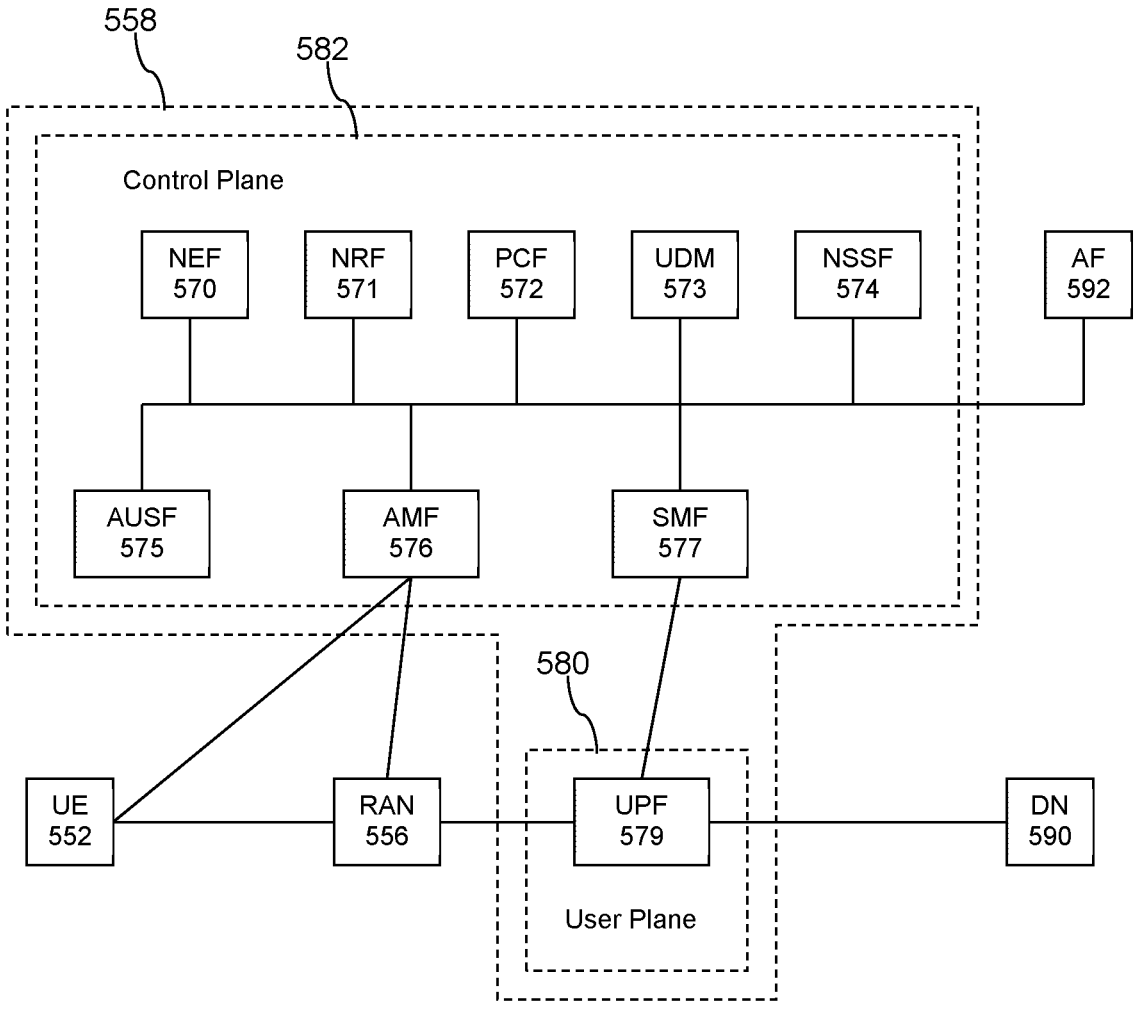

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
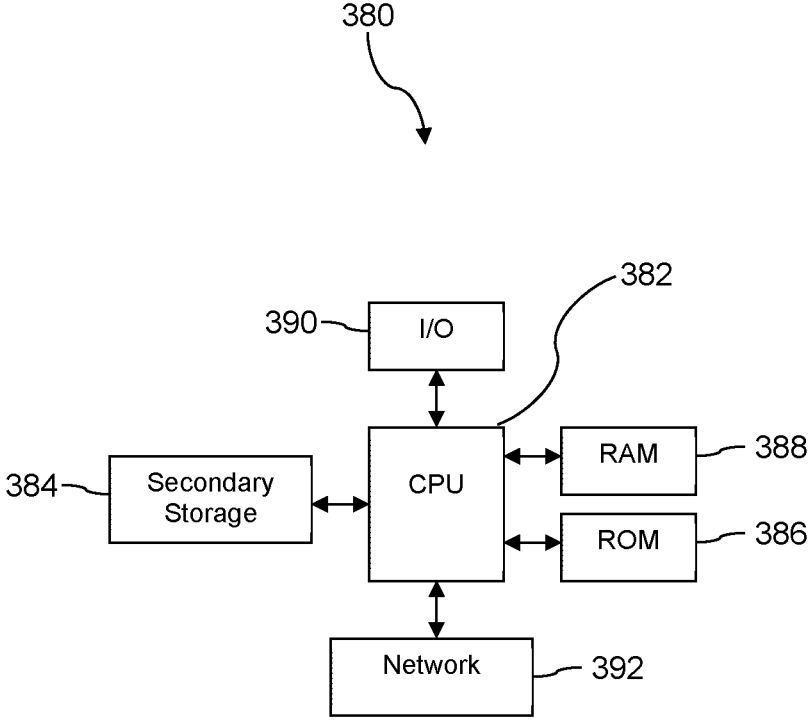
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is funda- mental to the electrical engineering and software engineer- ing arts that functionality that can be implemented by loading executable software into a computer can be con- verted to a hardware implementation by well-known design rules. Decisions between implementing a concept in soft- ware versus hardware typically hinge on considerations of stability of the design and numbers of units to be produced rather than any issues involved in translating from the software domain to the hardware domain. Generally, a design that is still subject to frequent change may be preferred to be implemented in software, because re-spin- ning a hardware implementation is more expensive than re-spinning a software design. Generally, a design that is stable that will be produced in large volume may be pre- ferred to be implemented in hardware, for example in an application specific integrated circuit (ASIC), because for large production runs the hardware implementation may be less expensive than the software implementation. Often a design may be developed and tested in a software form and later transformed, by well-known design rules, to an equiva- lent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or applica- tion. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non- volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instruc- tions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, key- boards, keypads, switches, dials, mice, track balls, voice recognizers, card readers, paper tape readers, or other well- known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectiv- ity devices 392 may provide wired communication links and/or wireless communication links (e.g., a first network connectivity device 392 may provide a wired communica- tion link and a second network connectivity device 392 may provide a wireless communication link). Wired communi- cation links may be provided in accordance with Ethernet (IEEE 802.3), Internet protocol (IP), time division multiplex (TDM), data over cable service interface specification (DOCSIS), wavelength division multiplexing (WDM), and/ or the like. In an embodiment, the radio transceiver cards may provide wireless communication links using protocols such as code division multiple access (CDMA), global system for mobile communications (GSM), long-term evo- lution (LTE), WiFi (IEEE 802.11), Bluetooth, Zigbee, nar- rowband Internet of things (NB IoT), near field communi- cations (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive infor- mation from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392.

While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for implementing performance-based alarming and resolution in a communication system comprising a radio access network, wherein the method comprises: determining, by a performance application in the communication system, an expected performance value of a network element in the radio access network based on a history of a key performance indicator describing the network element over a predefined period of time, wherein the expected performance value comprises a permissible range or a threshold of the key performance indicator for the network element; obtaining, by the performance application, a performance rule for the key performance indicator, wherein the performance rule is based on the expected performance value of the network element; determining, by the performance application, a current value of the key performance indicator of the network element; comparing, by the performance application, the current value of the key performance indicator with one or more false positive factors prior to determining whether to alert an incident reporting application to generate a performance alarm; inputting, by the performance application, the current value of the key performance indicator into the performance rule to determine whether to alert the incident reporting application to generate the performance alarm based on the current value of the key performance indicator being beyond the permissible range or the threshold of the key performance indicator indicated in the expected performance value; generating, by the incident reporting application, the performance alarm and a corresponding incident report based on the current value of the key performance indicator in response to receiving an alert from the performance application to generate the performance alarm based on the current value of the key performance indicator; and updating, by the performance application, the expected performance value of the network element and the performance rule based on feedback data received from a network operations center.

2. The method of claim 1, wherein the feedback data from the network operations center indicates at least one of whether the current value of the key performance indicator correctly indicated a performance-related incident at the network element or a status of a resolution performed to correct the performance-related incident at the network element.

3. The method of claim 1, wherein the key performance indicator describing the network element is associated with at least one of access failures at the network element, dropped calls at the network element, or a sleepy cell associated with the network element.

4. The method of claim 1, wherein the performance rule is further based on at least one of a location of the network element or the time of determining the current value of the key performance indicator.

5. The method of claim 1, further comprising:

obtaining, from a data store of the communication system, a second history of a second key performance indicator describing the network element over the predefined period of time; and determining, by the performance application, a second expected performance value of the network element based on the second history of the second key performance indicator, wherein the second expected performance value corresponds to the second key performance indicator describing the network element, and wherein the second expected performance value comprises a permissible range or a threshold of the second key performance indicator for the network element, wherein the performance rule is further based on the second expected performance value of the network element.

6. A communications system implemented in a network comprising a radio access network, wherein the communications system comprises: a performance application executing on a first computer system, wherein the performance application is configured to: generate an expected performance value of a network element in the radio access network based on a history of a key performance indicator describing the network element over a predefined period of time, wherein the expected performance value comprises a permissible range or a threshold of the key performance indicator for the network element, and wherein the key performance indicator is associated with at least one of access failures, dropped calls, or a sleepy cell associated with the network element; generate a performance rule for the key performance indicator, wherein the performance rule comprises a logic-based function based on the expected performance value of the key performance indicator; and input a current value of the key performance indicator of the network element into the performance rule to compare the expected performance value of the key performance indicator with the current value of the key performance indicator and determine whether to alert an incident reporting application to generate a performance alarm, wherein the incident reporting application executes on a second computer system and is configured to generate the performance alarm in response to receiving an alert from the performance application to generate the performance alarm based on the current value of the key performance indicator.

7. The communications system of claim 6, wherein, when the key performance indicator is associated with access failures, the expected performance value of the network element and the current value of the key performance indicator of the network element indicate at least one of an access failure count or an access failure rate over a period of time.

8. The communications system of claim 6, wherein, when the key performance indicator is associated with dropped calls, the expected performance value of the network element and the current value of the key performance indicator of the network element indicate at least one of a dropped call count or a dropped call rate over a period of time.

9. The communications system of claim 6, wherein, when the key performance indicator is associated with sleepy cells, the expected performance value of the network element and the current value of the key performance indicator of the network element indicate a traffic rate over a period of time.

10. The communications system of claim 6, wherein the performance application is further configured to determine whether to alert the incident reporting application to generate the performance alarm based on a false positive factor, wherein the false positive factor is based on at least one of a maintenance window during which a maintenance event is performed on the network element, a location of the network element, an event occurring within range of the network element, frequency bands through which traffic is permitted to be forwarded on at the network element, or unreliable data.

11. The communications system of claim 6, wherein the predefined period of time comprises from four to six weeks.

12. A method for implementing performance-based alarming and resolution in a communication system comprising a radio access network, wherein the method comprises obtaining, from a data store of the communication system, a history of a key performance indicator describing a network element in the radio access network over a predefined period of time; determining, by a performance application in the communication system, an expected performance value of the network element in a time range based on the history of the key performance indicator, and wherein the expected performance value comprises a permissible range or a threshold of the key performance indicator for the network element obtaining, by the performance application, a performance rule for the key performance indicator, wherein the performance rule is based on the expected performance value of the network element; determining, by the performance application, a current value of the key performance indicator of the network element at a time within the time range, wherein the performance rule is further based on at least one of a location of the network element or the time of determining the current value of the key performance indicator; inputting, by the performance application, the current value of the key performance indicator into the performance rule to output a first determination regarding whether to alert an incident reporting application to generate a performance alarm based on the current value of the key performance indicator being beyond the permissible range or the threshold of the key performance indicator indicated in the expected performance value; validating, by the performance application, the first determination regarding whether to alert the incident reporting application to generate the performance alarm with a false positive factor associated with the key performance indicator to obtain a second determination regarding whether to alert the incident reporting application to generate the performance alarm; and generating, by the incident reporting application, the performance alarm based on the second determination and in response to receiving an alert from the performance application, wherein the performance alarm indicates the current value of the key performance indicator and a potential performance-related incident at the network element.

13. The method of claim 12, wherein the key performance indicator describing the network element is associated with at least one of access failures at the network element, dropped calls at the network element, or a sleepy cell associated with the network element.

14. The method of claim 12, wherein the false positive factor is based on at least one of a maintenance windows during which a maintenance event is performed on the network element, a location of the network element, an event occurring within range of the network element, frequency bands through which traffic is permitted to be forwarded by the network element, or a state of the network element.

15. The method of claim 12, further comprising:

obtaining, from the data store of the communication system, a second history of a second key performance indicator describing the network element over the predefined period of time; and determining, by the performance application, a second expected performance value of the network element in the time range based on the second history of the second key performance indicator, wherein the second expected performance value comprises a permissible range or a threshold of the second key performance indicator for the network element, wherein the performance rule is further based on the second expected performance value of the network element.

16. The method of claim 12, further comprising generating, by the incident reporting application, an incident report based on the performance alarm, wherein the incident report is forwarded to a network operation center (NOC) or to an automated resolution system to correct the potential performance-related incident at the network element.

17. The method of claim 12, further comprising combining, by the incident reporting application, the performance alarm with a parent alarm to create a single incident report for both the performance alarm and the parent alarm, wherein the parent alarm comprises at least one of another performance alarm or an equipment alarm.

* * * * *